(12) United States Patent
Meister

(10) Patent No.: US 9,625,059 B2
(45) Date of Patent: Apr. 18, 2017

(54) CLAMPING DEVICE FOR CONNECTING PROFILE BARS

(71) Applicant: Salzgitter Mannesmann Stahlhandel GmbH, Dusseldorf (DE)

(72) Inventor: Steffen Meister, Wedemark (DE)

(73) Assignee: SALZGITTER MANNESMANN STAHLHANDEL GMBH, Dusseldorf (DE)

( * ) Notice: Subject to any disclaimer, the term of this patent is extended or adjusted under 35 U.S.C. 154(b) by 0 days.

(21) Appl. No.: 14/708,437

(22) Filed: May 11, 2015

(65) Prior Publication Data

US 2016/0252196 A1 Sep. 1, 2016

(30) Foreign Application Priority Data

May 12, 2014 (DE) .................. 10 2014 106 656

(51) Int. Cl.
| | | |
|---|---|---|
| *E21F 17/02* | (2006.01) | |
| *F16L 3/12* | (2006.01) | |
| *E04B 9/16* | (2006.01) | |
| *F16B 2/06* | (2006.01) | |
| *F16B 7/04* | (2006.01) | |
| *F16B 2/10* | (2006.01) | |

(52) U.S. Cl.
CPC .............. *F16L 3/1211* (2013.01); *E04B 9/16* (2013.01); *F16B 2/065* (2013.01); *F16B 7/0493* (2013.01); *F16B 2/10* (2013.01)

(58) Field of Classification Search
CPC F16B 2/065; F16B 2/10; F16L 3/1211; E04B 9/16
See application file for complete search history.

(56) References Cited

U.S. PATENT DOCUMENTS

| | | | | |
|---|---|---|---|---|
| 7,954,771 | B2 * | 6/2011 | Paulig .................... | A62C 35/68 169/16 |
| 8,480,041 | B2 * | 7/2013 | Myers .................... | F16L 3/1211 24/16 R |
| 2005/0139743 | A1 | 6/2005 | Shim | |

FOREIGN PATENT DOCUMENTS

| | | |
|---|---|---|
| DE | 251701 | 9/1910 |
| DE | 92 01 081 U1 | 7/1992 |
| DE | 60 2005 002 410 T2 | 6/2008 |
| KR | 20040062126 A | 7/2004 |

* cited by examiner

Primary Examiner — Amy Sterling
(74) Attorney, Agent, or Firm — Ladas & Parry LLP

(57) ABSTRACT

A clamping device for connecting a first profile to a second profile that is suspended from a ceiling and runs transversely to the first profile, including a clamp with two shanks that can be adjusted relative to one another, each having a recess for receiving and fixing the first profile and each with an end section for being fixed to a section of the second profile, and having a screw element for moving the shanks toward one another. The clamping device allows a closing sheet with stops, which closing sheet cooperates with the shanks of the clamp.

16 Claims, 18 Drawing Sheets

Figure 1B:
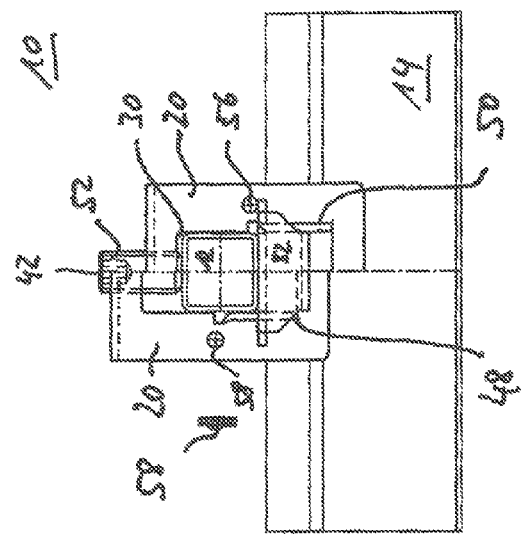

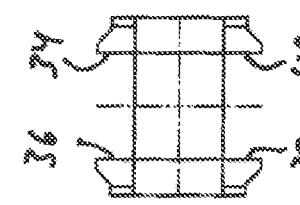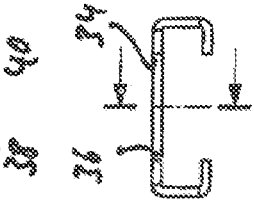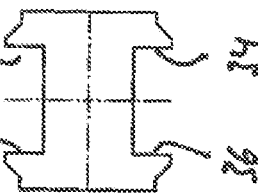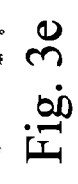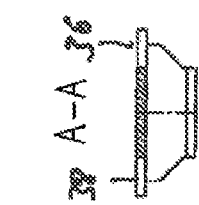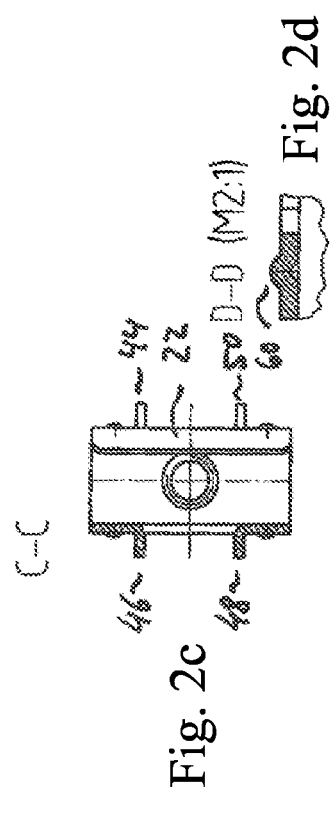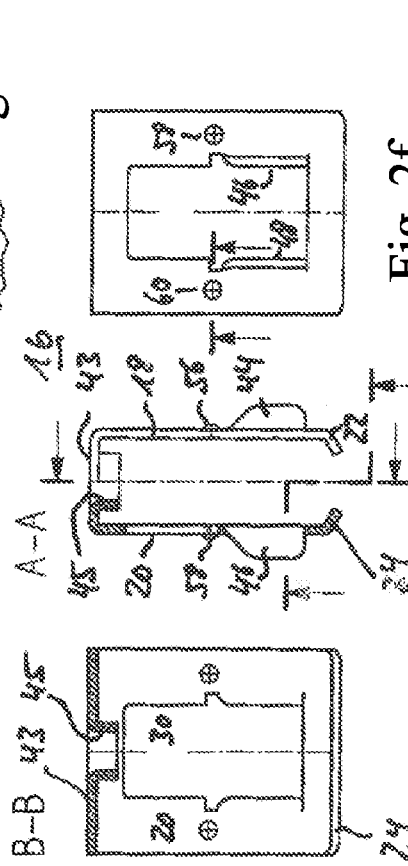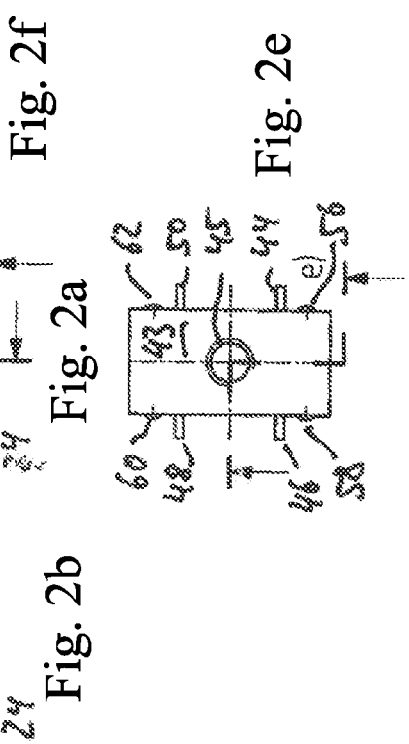

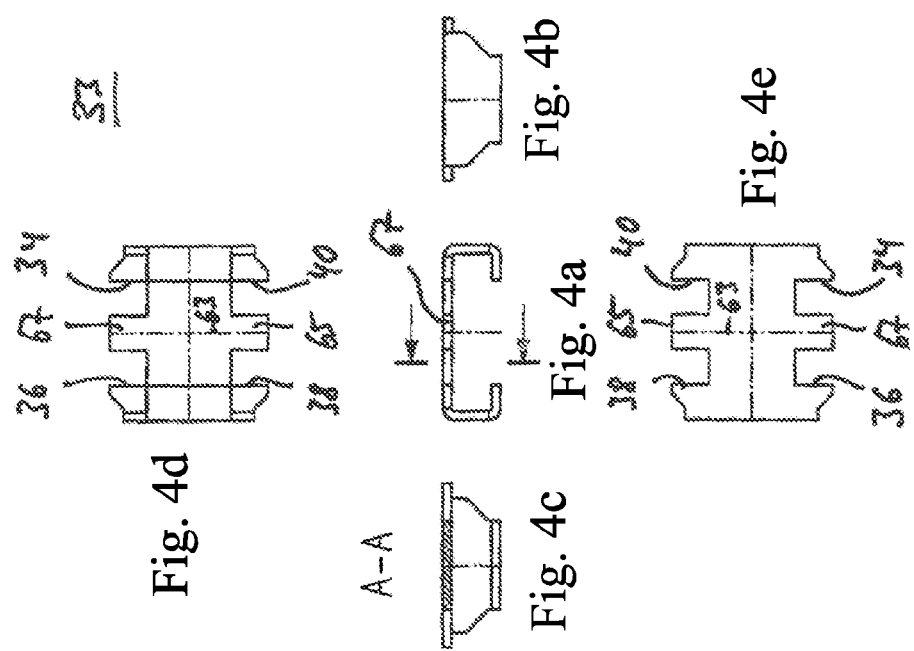

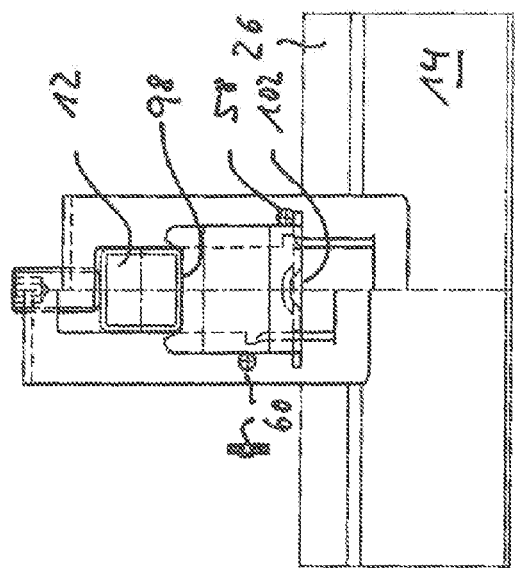
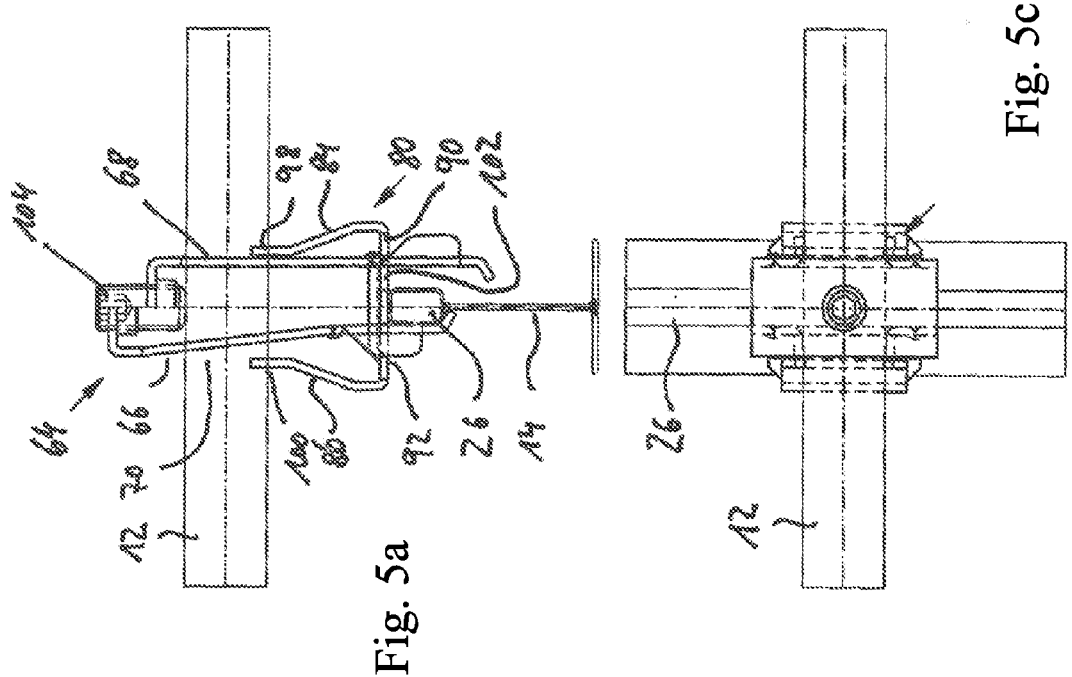
Fig. 5a  Fig. 5b  Fig. 5c

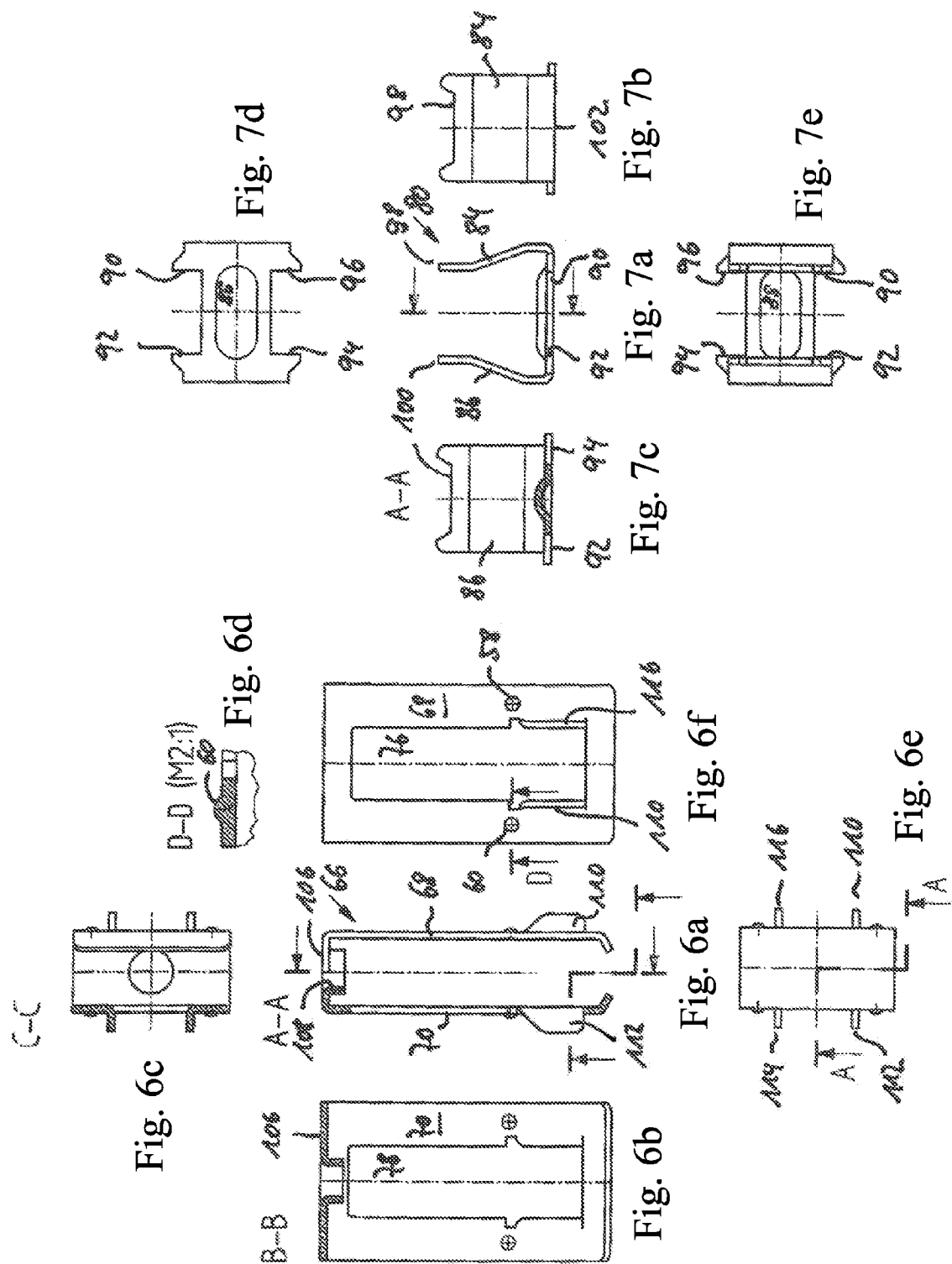

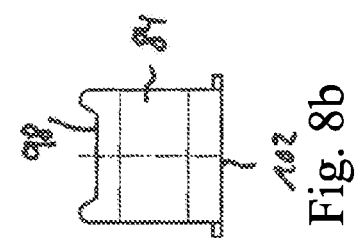
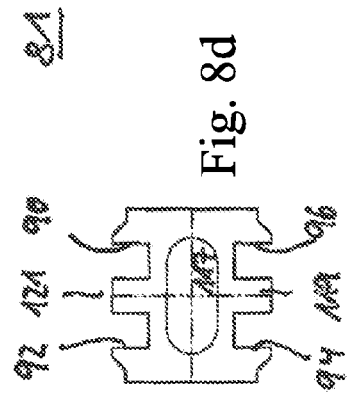
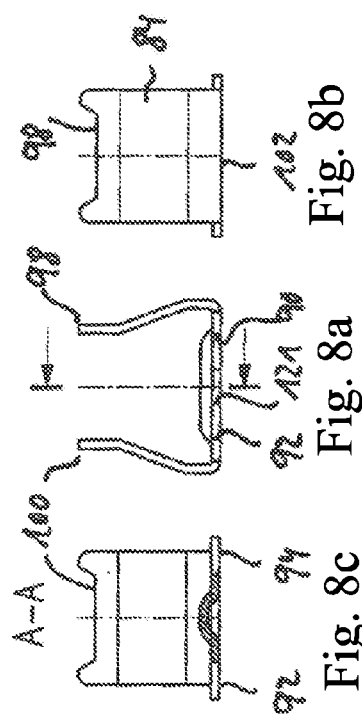
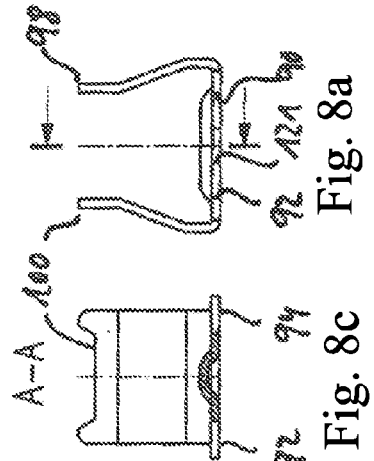
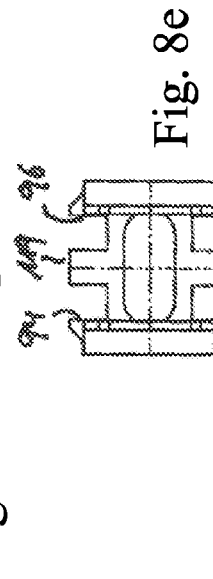

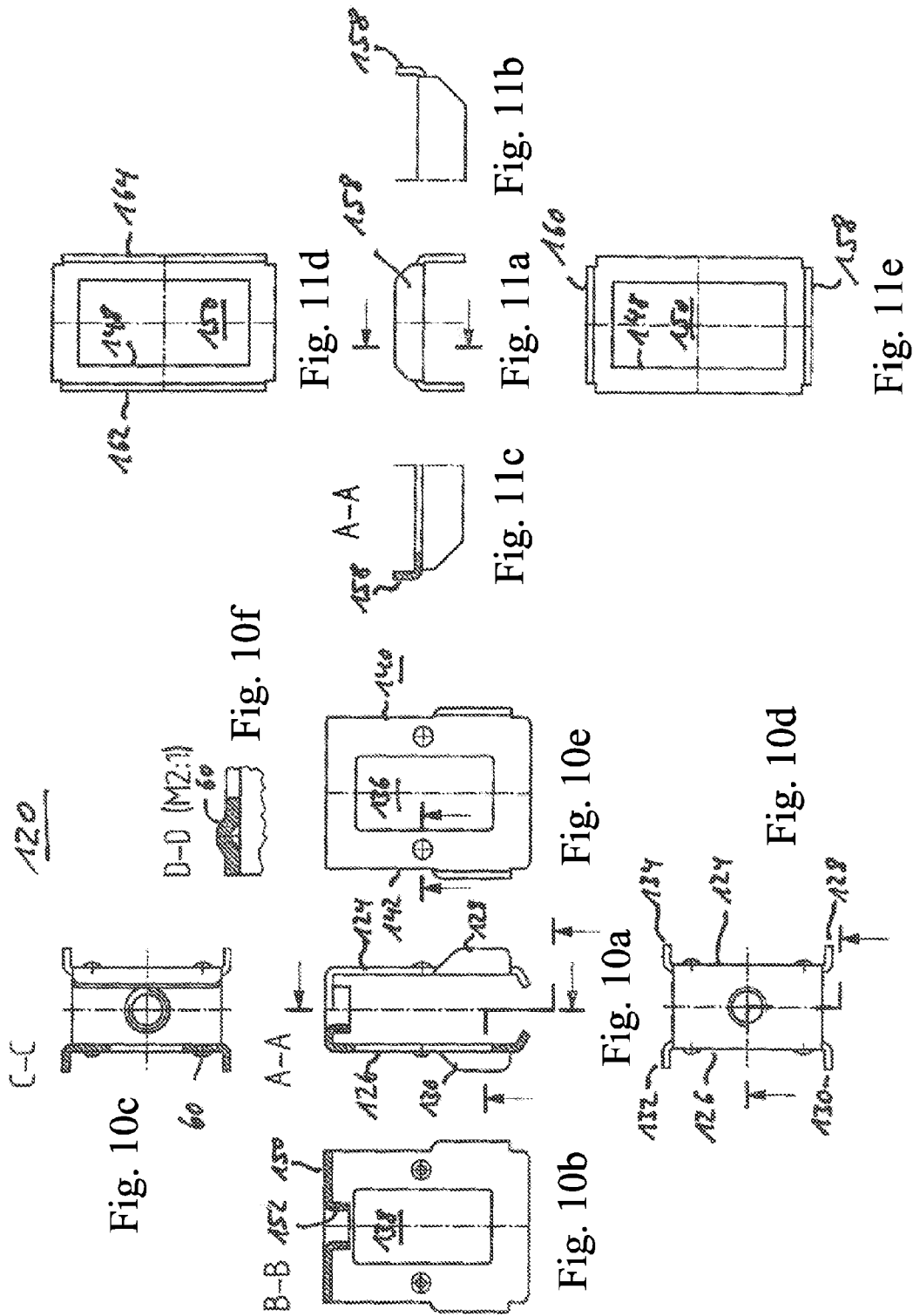

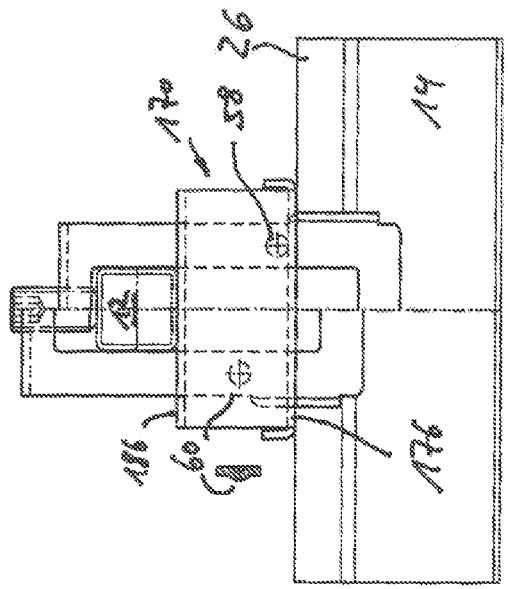
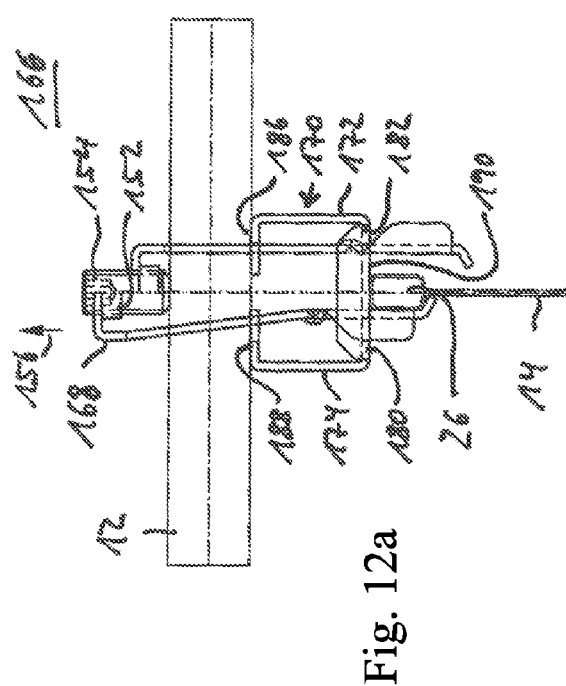
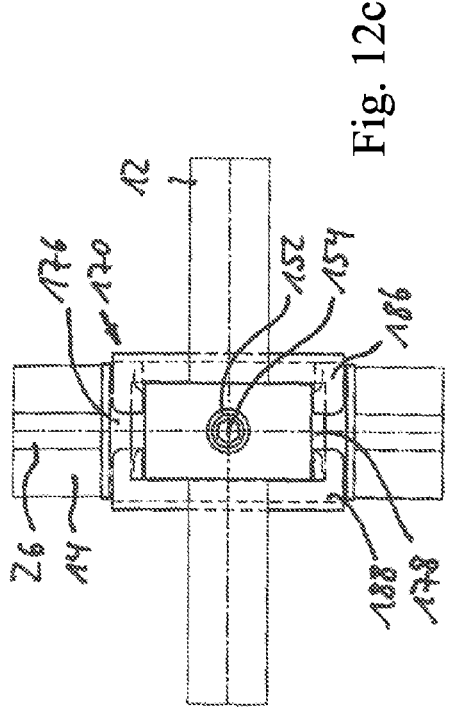
Fig. 12a
Fig. 12b
Fig. 12c

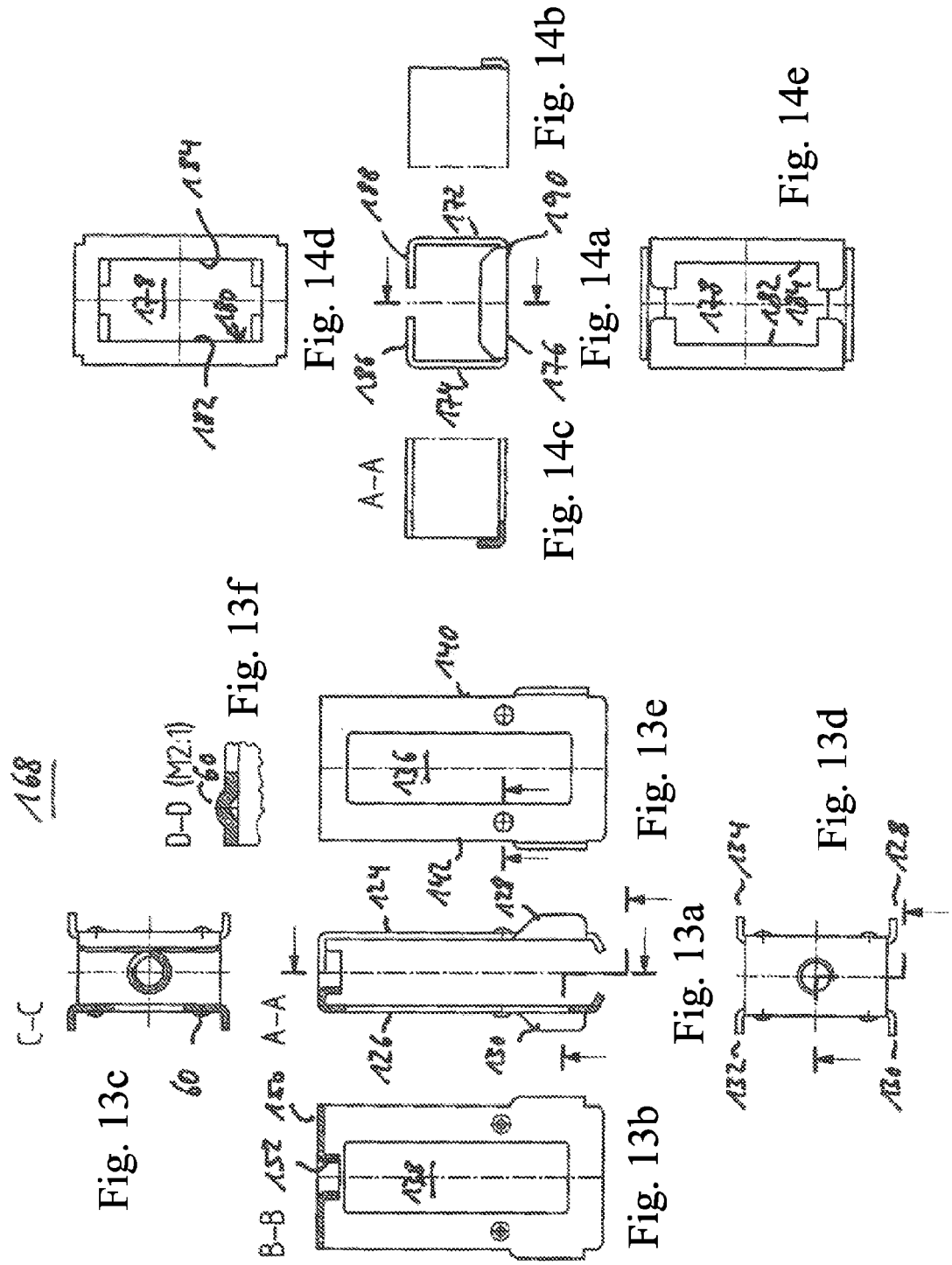

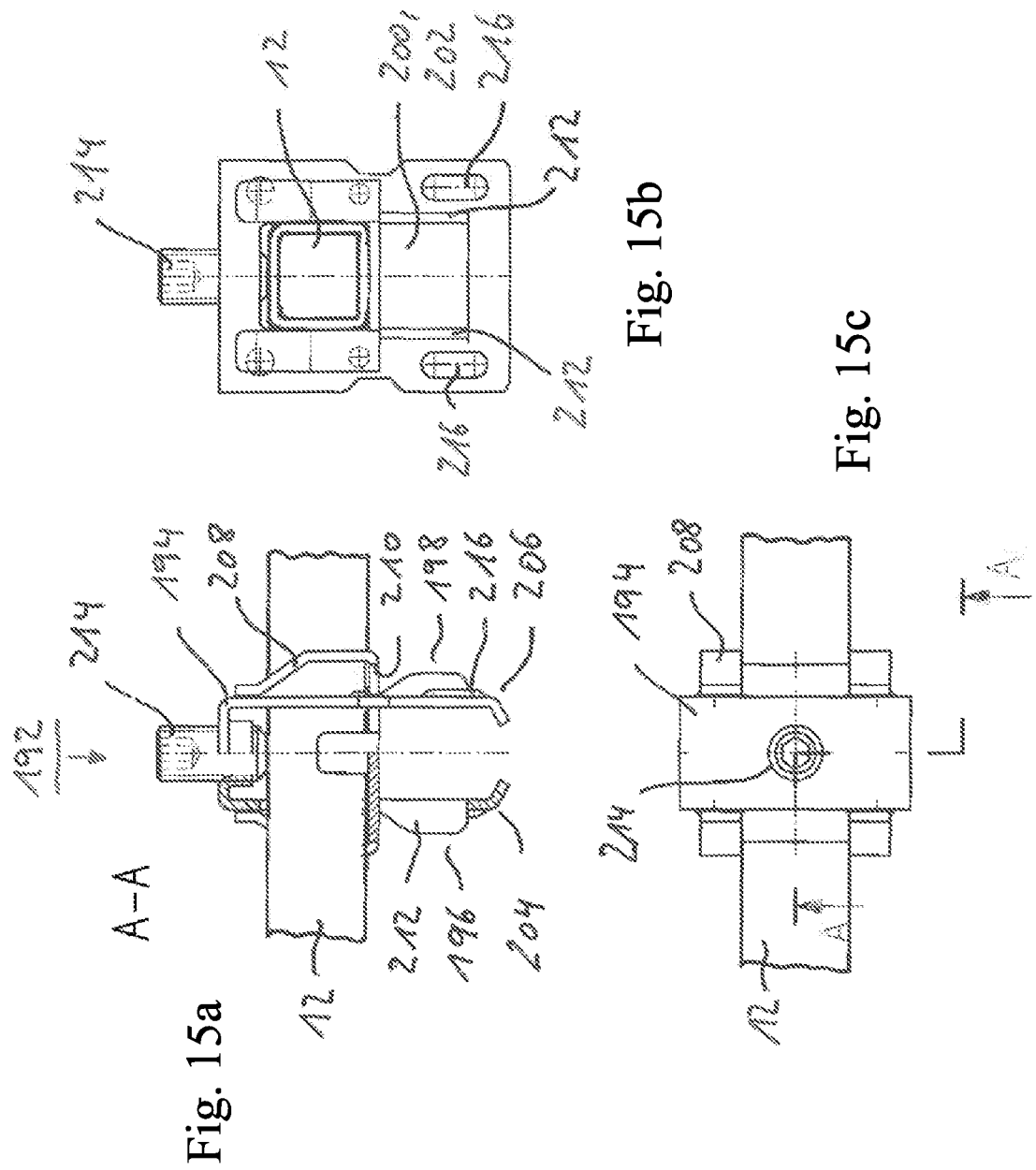

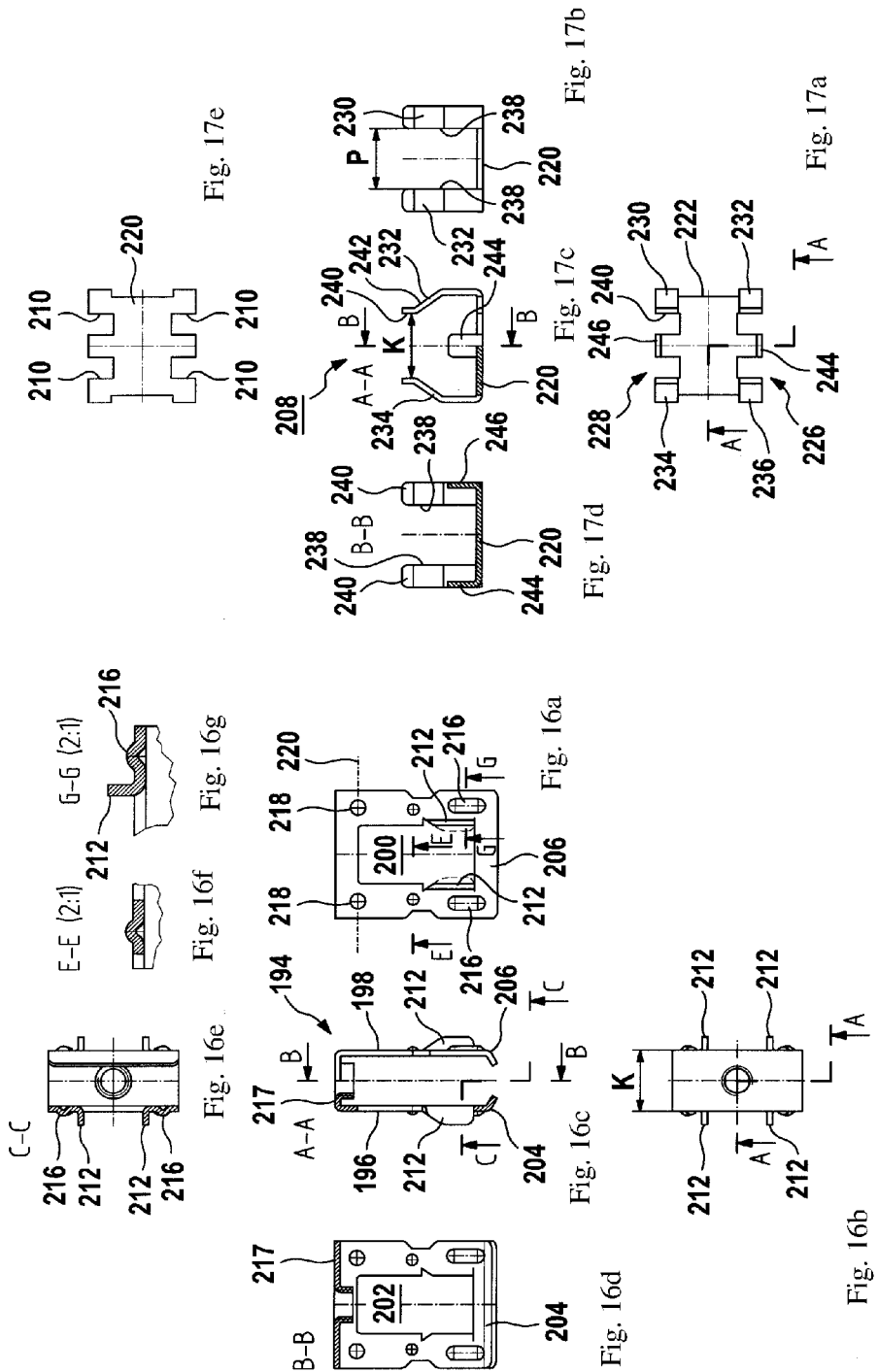

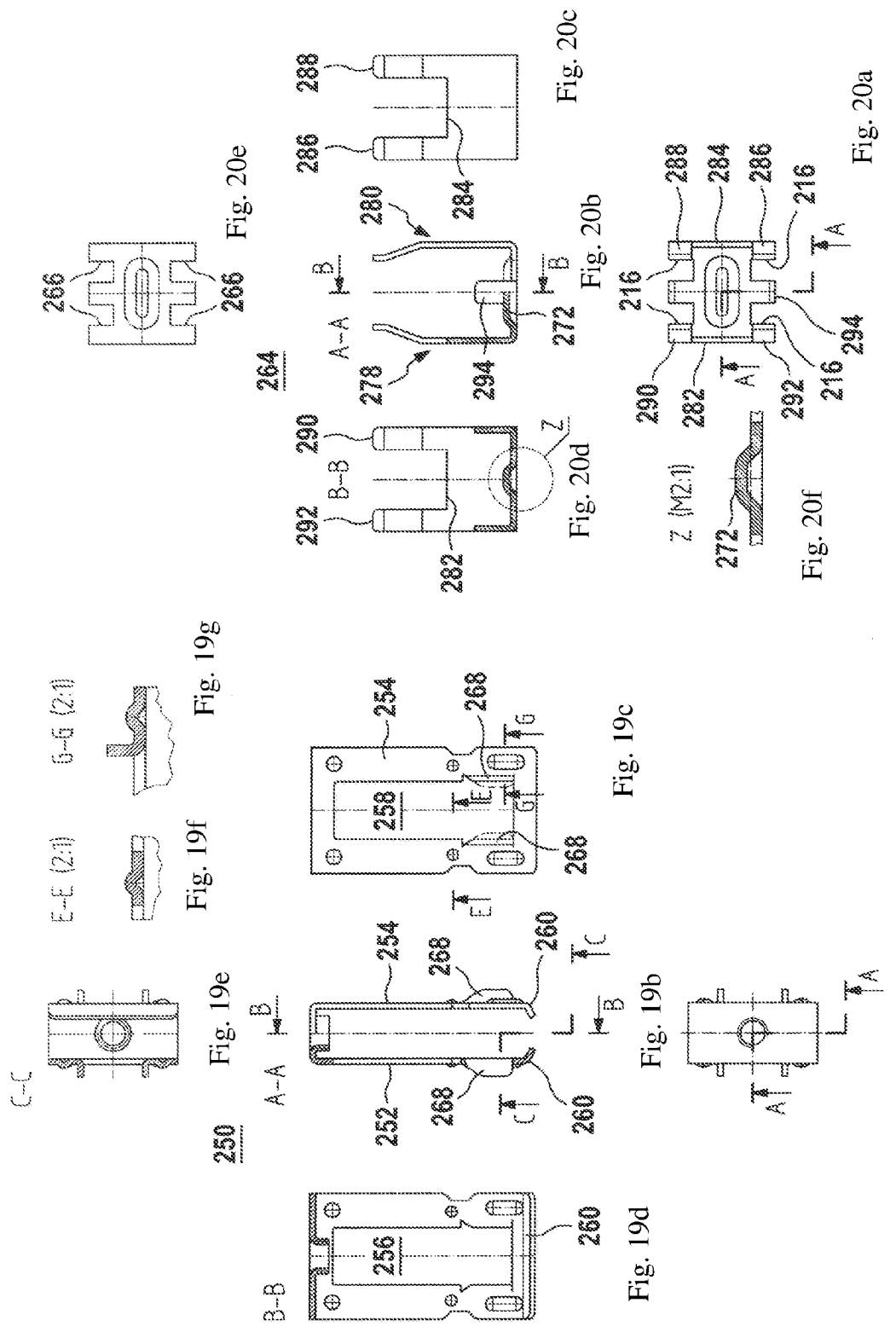

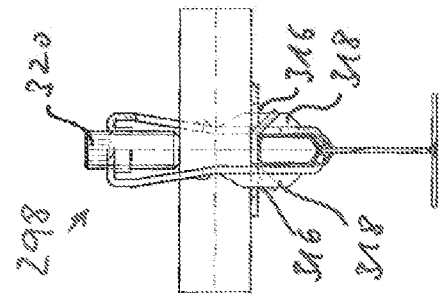
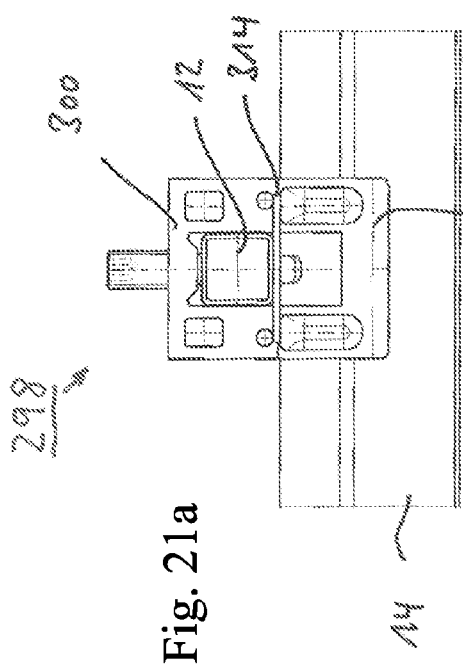
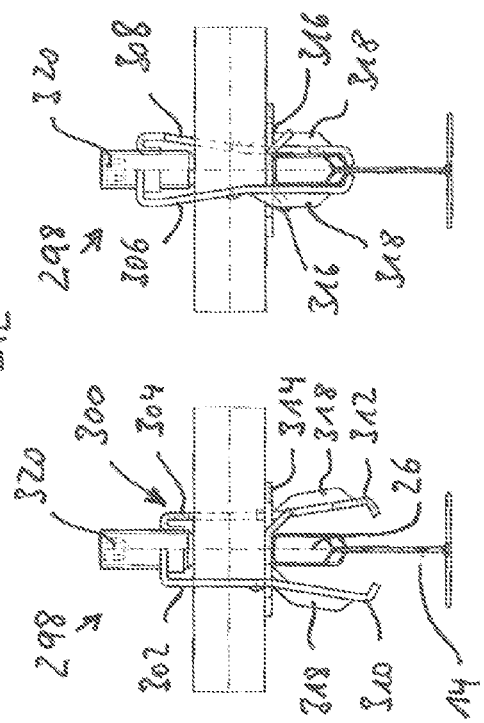
Fig. 21a
Fig. 21b
Fig. 21c
Fig. 21d

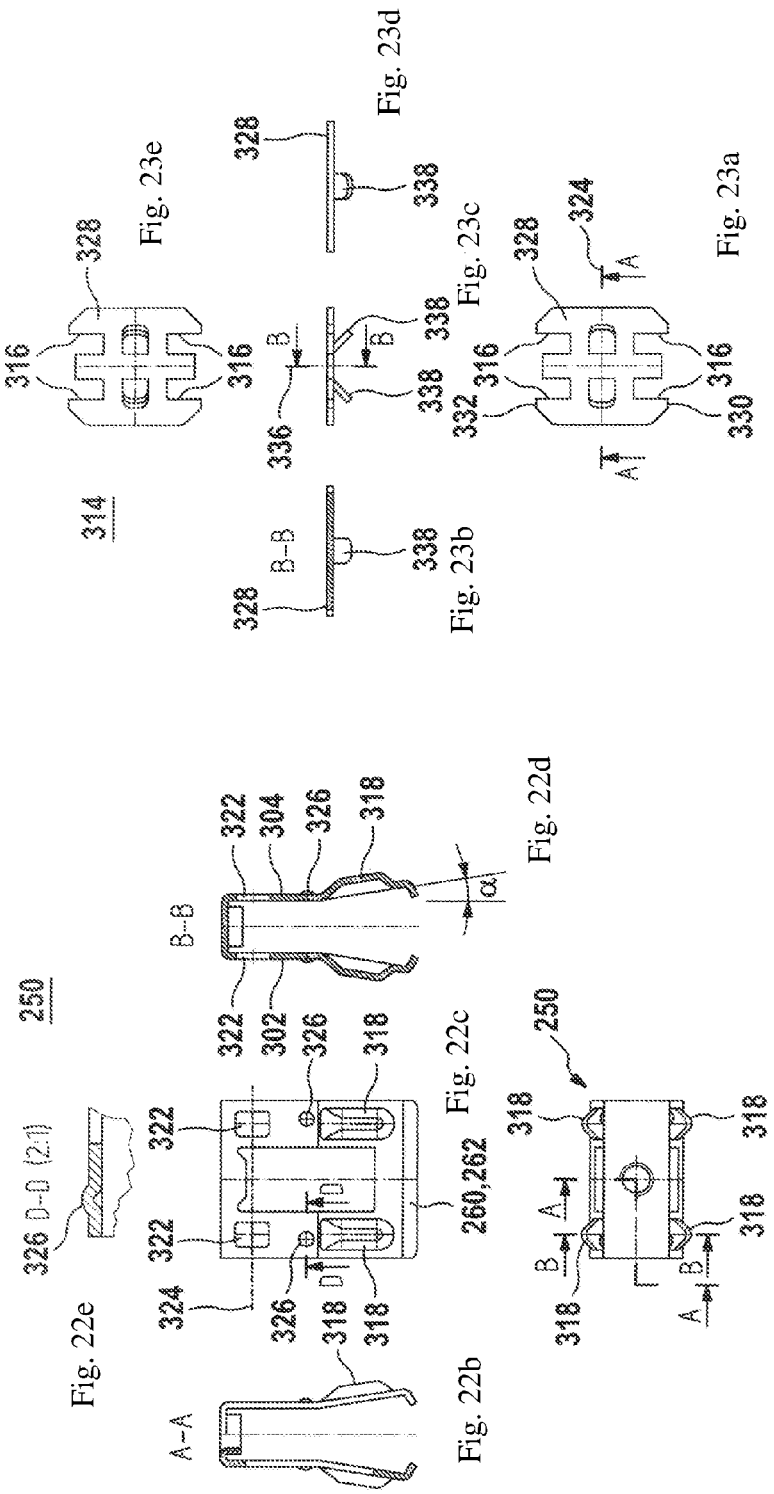

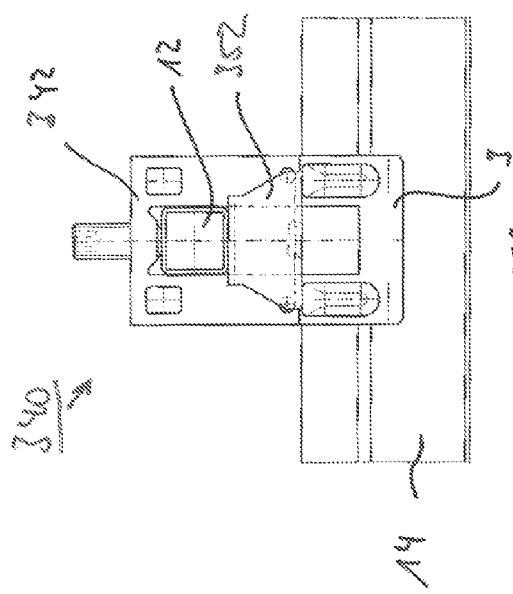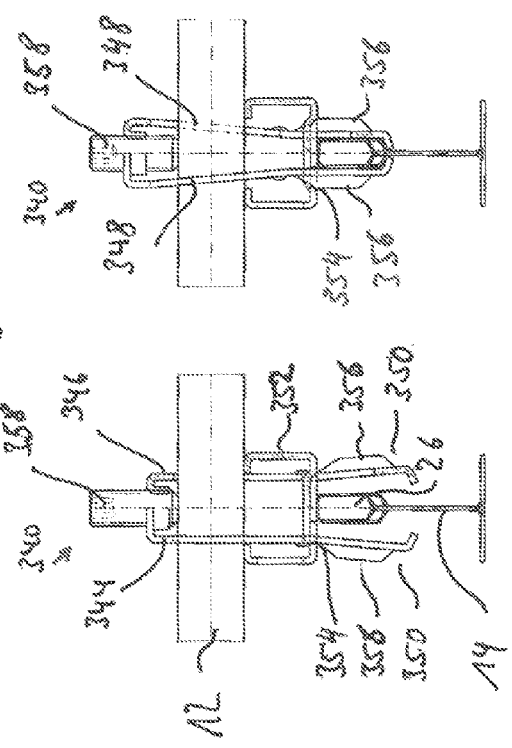

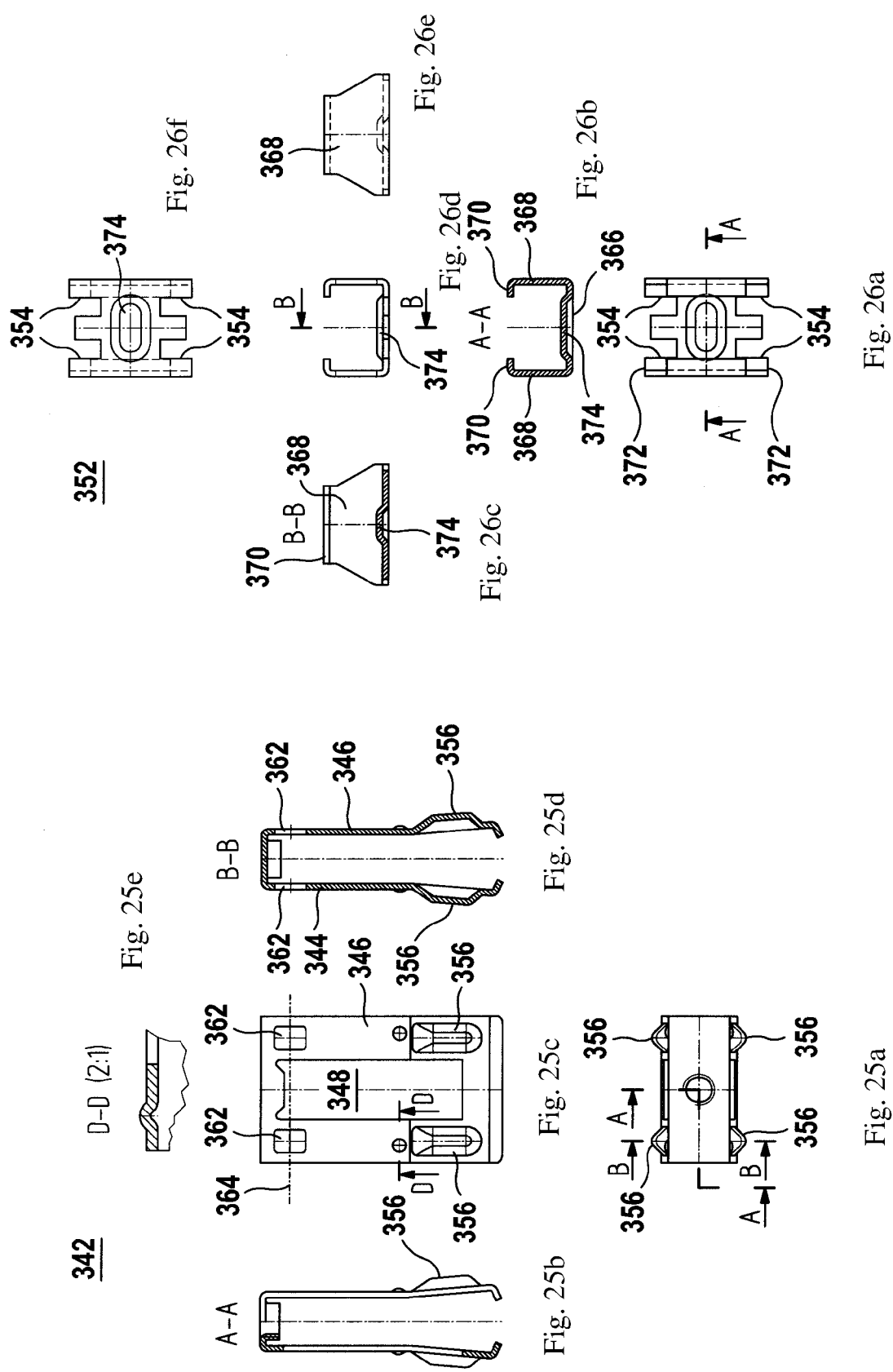

CLAMPING DEVICE FOR CONNECTING PROFILE BARS

This application claims priority to German Application No. 102014106656.1 filed May 12, 2014.

The invention relates to a clamping device for connecting a first profile such as a square profile to a second profile such as a T profile that preferably hangs from a ceiling and runs transversely to the first profile, comprising a clamp with two shanks that can be adjusted to one another and have a recess for receiving and fixing the first profile and with an end section for being fixed to a section of the second profile, and comprising a screw element for moving the shanks toward one another.

A clamping device of the initially cited type is described in the prospectus "4.0 Flexschlauch/Halterung" [German=Flexible Hose/Holder], status: 1/08; of the company Salzgitter Mannesmann Stahlhandel GmbH in section 4.3 "VIROTEC-Halterung [German=Holder] VX-SH". A first profile in the form of a square profile as transverse rod is fastened with the clamping device to a T-shaped profile bar of a louvered ceiling. The transverse rod serves to receive a holder for aligning and fastening a flexible hose of a sprinkler, e.g., in the center of a ceiling plate inside a ceiling louver.

The clamping device comprises a holder with two shanks that can be adjusted to one another. A rectangularly shaped recess is formed in each of the shanks so that the clamping device can be pushed onto the square profile. The shanks are moved onto one another by a screw element that extends through the two shanks and runs in the longitudinal direction of the first profile so that the clamping device is fixed to a ceiling section of the second profile by the ends of the shanks and the square profile is clamped in the recesses of the shanks.

In the known embodiment of the clamping device the screw element runs in the longitudinal direction and underneath the first profile, so that the accessibility and mounting of the screw element is adversely affected by the first profile, since, e.g., a wrench for socket head cap screws cannot be rotated freely through 360°.

Furthermore, the section of the second profile to which the clamping device is to be fixed can have different dimensions conditioned by the manufacturer. A secure fixing of the known clamping device to different embodiments of profile bars is not ensured in the case of the known clamping device.

DE 92 01 081 U1 relates to a louvered ceiling for clean rooms that comprises carrier bars arranged at an angle to each other that form louvered ceiling openings in whose area filter elements are arranged. The louvered ceiling comprises carrier bars connected to each other by coupling pieces. The coupling pieces located in the corner area of the louvered ceiling comprise two connection arms located at an angle relative to each other for the carrier bars. The coupling pieces are provided in the area of the edges of the louvered ceiling with three connection arms and inside the louvered ceiling with four connection arms. The carrier bars and the coupling pieces can be constructed in a known manner and connected to each other, preferably by screw connections.

DE 60 2005 002 410 T2 relates to a louvered ceiling in a dry construction with a wall profile for supporting the ceiling carriers. The wall profile has a pair of shaped, holding clamps arranged in a regular interval along the profile and cut out of the horizontal border of the profile, whereas the profile is profiled by rollers, a mold or in some other manner. The pair of clamps operate together with a single locking tooth on the border in one embodiment or with two locking teeth in another embodiment in order to position and lock the carrier flanges on the border by a single back-and-forth movement. The flanges are held down on the border by clamps that are pre-tensioned by springs.

DE 251 701 A describes a device for manufacturing wall elements from concrete into which, for connecting adjacent wall elements, a frame that surrounds them and consists of a C-shaped, outwardly open profile is embedded in concrete. The device comprises shaping walls whose width corresponds to the thickness of the wall element to be manufactured and to which the frame can be fixed in a predetermined position. The shaping walls comprise recesses through which a clamp that is U-shaped in cross section and comprises a flap arranged on the free ends of its two shanks approximately vertically to the shanks extends transversely in the open frame and extends behind it with its flaps and the two bends that face each other of the profile, that is C-shaped in cross section and of which the frame consists. Furthermore, it is provided that an oblong body can be inserted between the web of each rod clamp and the associated shaping walls for pressing the shaping wall onto the frame.

The present invention has the basic problem of further developing a clamping device of the initially cited type in such a manner that it can be simply handled with an improved fixing of the profiles.

The problem is solved according to the invention, among other things, by that the clamping device comprises a closing sheet with stops, which closing sheet cooperates with the shanks of the clamp, that the screw element starts from a section connecting the shanks and can be supported against the first profile for adjusting the shanks relative to the closing sheet, whereby sections projecting from the shanks cooperate with the stops and during the adjusting of the clamp the pivoting of the shanks onto one another brings about a positive connection of the end sections to the section of the second profile.

The embodiment according to the invention is characterized over the prior art in that a relative movement between the clamp and the closing sheet is brought about by activating the screw element, as a result of which end sections of the shanks are fixed against the section of the second profile. The relative movement between the clamp and the closing sheet also takes place in the closed state of the shanks, as a result of which, corresponding to the position of the screw, an adaptation to different embodiments of the section of the second profile, in particular an adaptation to the height of the section of the second profile is achieved and therefore an exact, positive connection is always ensured.

Since the screw element is received in a clamp section connecting the shanks, it runs vertically to a plane stretching from the first and the second profile and transversely to a longitudinal extension of the first profile, with the result that the screw element is freely accessible and manageable on the ceiling side during the mounting. In this embodiment a screw tool such as, e.g., a wrench for socket head cap screws can be placed on, e.g., from above on the ceiling during the ceiling mounting and freely rotate through 360°.

A preferred embodiment provides that the screw element is received as a threaded pin in a threading introduced into the section or in a nut starting from the section. The screw element runs vertically here to a plane stretching from the closing sheet, wherein a ceiling-side end is formed as a tool receptacle and is freely accessible and wherein a profile-side end can be supported against the first profile. The sections of the shanks can also move continuously even in the closed state along the stops of the closing clamp so that the clamp can be adjusted until the bent end sections of the shanks come to rest on a lower edge of the section of the second profile.

In a preferred embodiment the clamp is constructed as a U-shaped formed sheet part, wherein the sections projecting from the shanks are constructed as edges or in the form of flaps or as impressions in the form of material curvatures. The material curvatures as alternatives to the flaps improve the function and stability of the clamp since on the one hand they bring about a stiffening of the shanks extending into the end section and on the other hand a greater support surface on the stops of the closing sheet during the closing of the clamp. In addition, the lateral guiding of the closing sheet is improved since no recesses are formed in the inner area.

The edge bendings can be formed on an inner edge of the rectangular recess or on an outer edge of the particular shank.

The edge bendings preferably run in planes running at a right angle to a plane extending from the shank.

The projecting impressions can be formed in lateral edge sections or arms of the particular shank in order to form a stiffening of the arms extending into the end section and to form a greater support surface.

According to a first embodiment the closing sheet comprises two preferably rectangular recesses opposing one another on the edge, wherein parallel edge sections of a recess that are opposite one another form one of the stops for the sections projecting from the shank and have an interval from one another that corresponds to an interval of the first shank from the second shank.

In a preferred embodiment the closing sheet is constructed as a level sheet and forms a first support that rests against the bottom of the first profile and forms a second support that rests against a top of the section of the second profile.

In order to stiffen the closing sheet it can be provided that reinforcements such as edge bendings are provided on the edge.

In order to arranged the first profile at a distance from the second profile a preferred embodiment provides that the closing sheet is preferably constructed in a U shape and comprises lateral shanks, wherein end sections of the shanks form the first support and a bottom of the section connecting the shanks forms the second support.

According to an alternative embodiment it is provided that the closing sheet comprises an inner frame through which clamp shanks extend, wherein the inner frame has a cross section adapted to a cross section of the clamp, wherein the inner frame forms the stops for the sections projecting from the shanks.

A preferred embodiment provides that the clamping device is composed as a pre-assembled unit. Either the closing sheet can be received in the shank recesses or the shanks can be received in the inner frame of the closing sheet. In order to fix the closing sheet on the clamp it is provided that at least two stud-like projections are associated preferably with each of the projecting sections of a shank, and that the closing sheet is fixed between a preferably ramp-shaped edge of one of the projecting shank sections and the at least one stud-shaped projection in the pre-assembled state.

The advantage is achieved by the pre-assembled closing sheet that the first profile with clamping devices set on it in the longitudinal direction can be reliably placed on the second profile, i.e., the T profile bar. The closing sheet forms a support here by the bottom support in conjunction with the fixing so that the pre-assembled unit remains independently standing even before the threaded pin was tightened.

Another preferred embodiment provides that the shanks have a material weakening such as a perforation in the form of holes or notches in a transitional area to the section receiving the screw element or in a central area along a bending line. As a result of the purposeful material weakening in the upper and/or central area of the shanks the bending tension is reduced so that during the closing of the clamp less force has to be expended. As a result, an elastic and low plastic deformation is achieved, which prevents the lateral distortion of the clamp during closing. Finally, a purposeful deformation or bending is made possible in the upper and/or central area along the defined bending line while maintaining a desired bending angle.

Furthermore, it is provided that the clamp shanks have preferably oblong, outwardly shaped formations for stiffening the shanks against bending in particular in their end section.

Both shanks in the central area are preferably already bent outward by an angle $\alpha$ before assembly already so that the end sections run in parallel after the closing without a deformation taking place in the central area. As a result, no bending tension (deformation) takes place in the central area so that the expenditure of force during the closing of the clamp is reduced. The above results in a reduction of the total assembly forces. Furthermore, a lateral distortion of the clamp is prevented.

According to a further development the closing sheets according to the invention are characterized in that they have shanks bent from a base plate and whose length corresponds approximately to the height of the first profile, wherein inner surfaces of the shanks rest in the assembled state on outside surfaces of the profile in order to form a guidance of the closing sheet opposite the clamp shanks. Furthermore, a lateral tipping away of the closing sheet is prevented by the support against the first profile.

Furthermore, it is provided that the closing sheet starting from the base plate has two other shanks that are bent along a longitudinal edge of the base plate and form a support of the clamp shanks inwardly and prevent an inward falling in of the shanks.

An alternative embodiment of a closing sheet in accordance with the invention is characterized in that two short, bent shanks are bent down along a central axis starting from the base plate, wherein the two inner shanks form a prismatic centring. This results in a be positioning, i.e., a lateral alignment of the clamp on the profile bar and in addition a locking of the clamp in the end section is achieved after the clamping device has been closed.

Other details, advantages and features of the invention result not only from the claims, the features to be gathered from them alone and/or in combination but also from the following description of the preferred exemplary embodiments to be gathered from the figures.

Figure 1A:
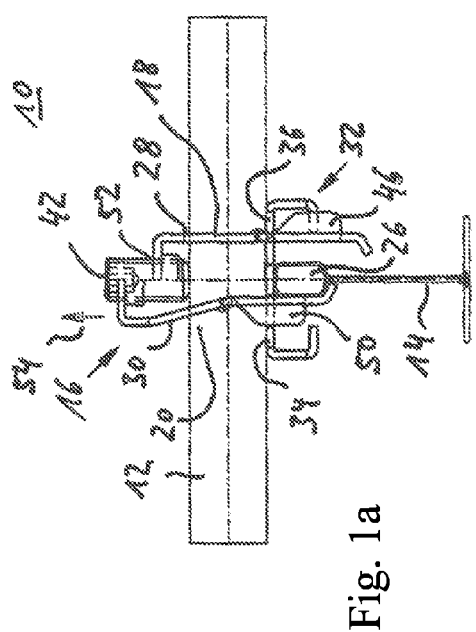
Figure 1C:
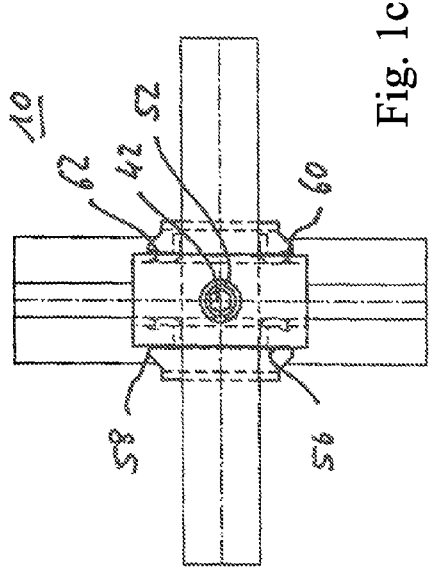
Figure 9A:
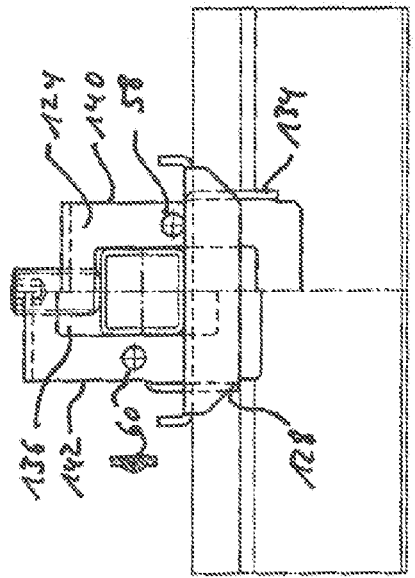
Figure 9B:
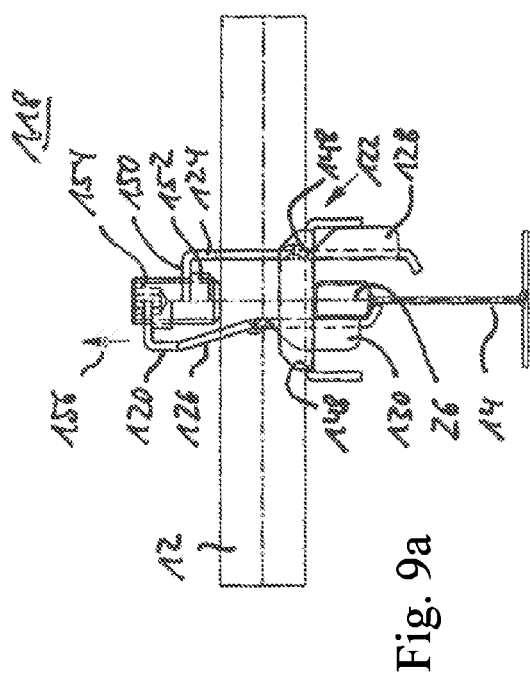
Figure 9C:
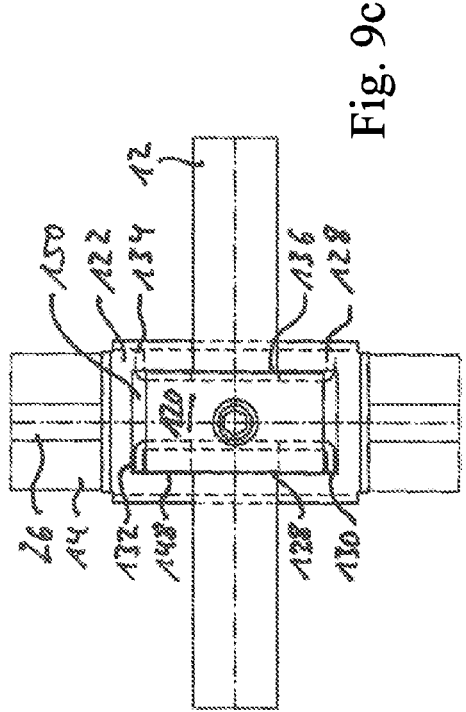
Figure 18B:
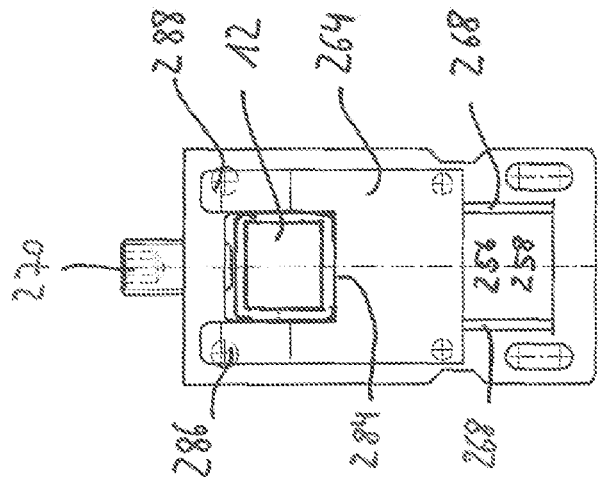
Figure 18A:
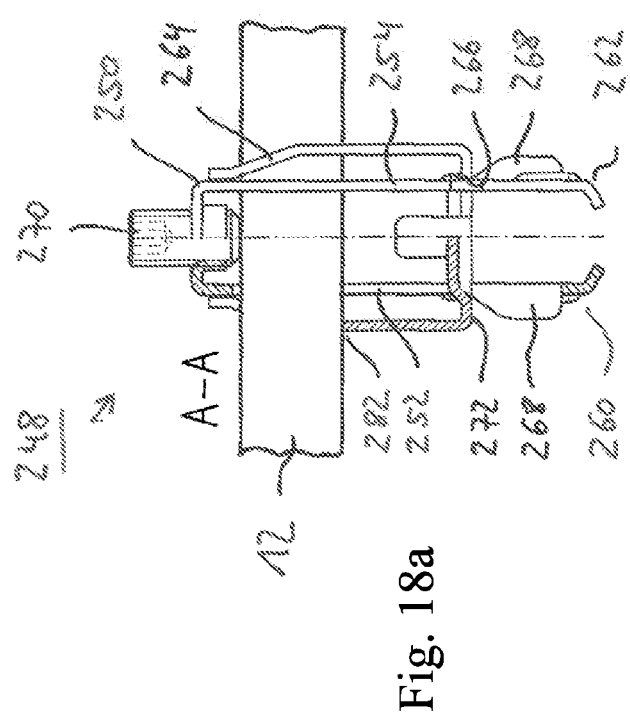
Figure 18C:
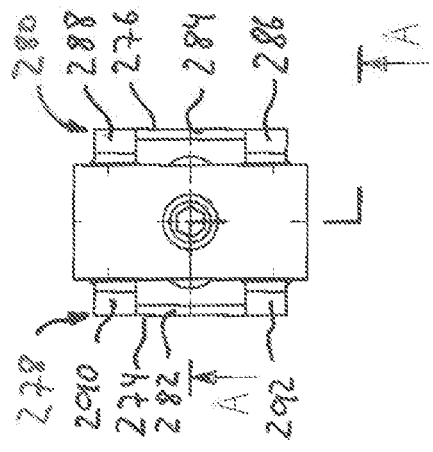

In the figures:

FIG. 1a shows a front view of a first embodiment of a clamping device in different assembly positions, FIG. 1b shows a side view of a first embodiment of a clamping device in different assembly positions, FIG. 1c shows a top view of a first embodiment of a clamping device in different assembly positions, FIG. 2a shows a front view in partial section of a first embodiment of a clamp, FIG. 2b shows a left side view in partial section of a first embodiment of a clamp, FIG. 2c shows a bottom view in partial section of a first embodiment of a clamp, FIG. 2d shows a detailed partial view of a first embodiment of a clamp, FIG. 2e shows a top view in partial section of a first embodiment of a clamp, FIG. 2f shows a right side view in partial section of a first embodiment of a clamp, FIG. 3a shows a front view of a first embodiment of a closing sheet, FIG. 3b shows a right side view of a first embodiment of a closing sheet, FIG. 3c shows a left side view in section of a first embodiment of a closing sheet, FIG. 3d shows a bottom view of a first embodiment of a closing sheet, FIG. 3e shows a top view of a first embodiment of a closing sheet, FIG. 4a shows a front view of a second embodiment of a closing sheet, FIG. 4b shows a right side view of a second embodiment of a closing sheet, FIG. 4c shows a left side view in section of a second embodiment of a closing sheet, FIG. 4d shows a bottom view of a second embodiment of a closing sheet, FIG. 4e shows a top view of a second embodiment of a closing sheet, FIG. 5a shows a front view of a second embodiment of a clamping device in different assembly positions, FIG. 5b shows a side view of a second embodiment of a clamping device in different assembly positions, FIG. 5c shows a top view of a second embodiment of a clamping device in different assembly positions, FIG. 6a shows a front view in partial section of a second embodiment of a clamp, FIG. 6b shows a left side view in partial section of a second embodiment of a clamp, FIG. 6c shows a bottom view in partial section of a second embodiment of a clamp, FIG. 6d shows a detailed partial view of a second embodiment of a clamp, FIG. 6e shows a top view in partial section of a second embodiment of a clamp, FIG. 6f shows a right side view in partial section of a second embodiment of a clamp, FIG. 7a shows a front view of third embodiment of a closing sheet, FIG. 7b shows a right side view in section of a third embodiment of a closing sheet, FIG. 7c shows a left side view in section of a third embodiment of a closing sheet, FIG. 7d shows a bottom view of third embodiment of a closing sheet, FIG. 7e shows a top view of third embodiment of a closing sheet, FIG. 8a shows a front view of a fourth embodiment of a closing sheet, FIG. 8b shows a right side view of a fourth embodiment of a closing sheet, FIG. 8c shows a left side view in section of a fourth embodiment of a closing sheet, FIG. 8d shows a bottom view of a fourth embodiment of a closing sheet, FIG. 8e shows a top view of a fourth embodiment of a closing sheet, FIG. 9a shows a front view of a third embodiment of a clamping device in different assembly positions, FIG. 9b shows a side view of a third embodiment of a clamping device in different assembly positions, FIG. 9c shows a top view of a third embodiment of a clamping device in different assembly positions, FIG. 10a shows a front view of a third embodiment of a clamp, FIG. 10b shows a left side view in section of a third embodiment of a clamp, FIG. 10c shows a bottom view of a third embodiment of a clamp, FIG. 10d shows a top view of a third embodiment of a clamp, FIG. 10e shows a right side view of a third embodiment of a clamp, FIG. 10f shows a detailed partial view of a third embodiment of a clamp, FIG. 11a shows a front view of a fifth embodiment of a closing sheet, FIG. 11b shows a right side view of a fifth embodiment of a closing sheet, FIG. 11c shows a left side view in section of a fifth embodiment of a closing sheet, FIG. 11d shows a bottom view of a fifth embodiment of a closing sheet, FIG. 11e shows a top view of a fifth embodiment of a closing sheet, FIG. 12a shows a front view of a fourth embodiment of a clamping device in different assembly positions, FIG. 12b shows a side view of a fourth embodiment of a clamping device in different assembly positions, FIG. 12c shows a top view of a fourth embodiment of a clamping device in different assembly positions, FIG. 13a shows a front view of a fourth embodiment of a clamp, FIG. 13b shows a left side view in section of a fourth embodiment of a clamp, FIG. 13c shows a bottom view of a fourth embodiment of a clamp, FIG. 13d shows a top view of a fourth embodiment of a clamp, FIG. 13e shows a right side view of a fourth embodiment of a clamp, FIG. 13f shows a detailed partial view of a fourth embodiment of a clamp, FIG. 14a shows a front view of a sixth embodiment of a closing sheet, FIG. 14b shows a right side view in section of a sixth embodiment of a closing sheet, FIG. 14c shows a left side view in section of a sixth embodiment of a closing sheet, FIG. 14d shows a bottom view of a sixth embodiment of a closing sheet, FIG. 14e shows a top view of a sixth embodiment of a closing sheet, FIG. 15a shows a front view of a fifth embodiment of a clamping device, FIG. 15b shows a back view of a fifth embodiment of a clamping device, FIG. 15c show a top view in section of a fifth embodiment of a clamping device, FIG. 16a shows a right side view of a fourth embodiment of a clamp, FIG. 16b shows a top view of a fourth embodiment of a clamp, FIG. 16c shows a front view of a fourth embodiment of a clamp, FIG. 16d shows a left side view in section of a fourth embodiment of a clamp, FIG. 16e shows a bottom view of a fourth embodiment of a clamp, FIG. 16f shows a first detailed partial view of a fourth embodiment of a clamp, FIG. 16g shows a second detailed partial view of a fourth embodiment of a clamp, FIG. 17a shows a top view of a seventh embodiment of a closing sheet, FIG. 17b shows a right side view of a seventh embodiment of a closing sheet, FIG. 17c shows a front view of a seventh embodiment of a closing sheet, FIG. 17d shows a left side view in section of a seventh embodiment of a closing sheet, FIG. 17e shows a bottom view of a seventh embodiment of a closing sheet, FIG. 18a shows a front view of a sixth embodiment of a clamping device, FIG. 18b shows a side view of a sixth embodiment of a clamping device, FIG. 18c shows a top view of a sixth embodiment of a clamping device, FIG. 19a shows a top view of a fifth embodiment of a clamp, FIG. 19b shows a front view of a fifth embodiment of a clamp, FIG. 19c shows a right side view of a fifth embodiment of a clamp, FIG. 19d shows a left side view in section of a fifth embodiment of a clamp, FIG. 19e shows a bottom view of a fifth embodiment of a clamp, FIG. 19f shows a first detailed partial view of a fifth embodiment of a clamp, FIG. 19g shows a second detailed partial view of a fifth embodiment of a clamp, FIG. 20a shows a top view of an eighth embodiment of a closing sheet, a FIG. 20b shows a front view of an eighth embodiment of a closing sheet, FIG. 20c shows a right side view of an eighth embodiment of a closing sheet, FIG. 20d shows a left side view in section of an eighth embodiment of a closing sheet, FIG. 20e shows a bottom view of an eighth embodiment of a closing sheet, FIG. 20f shows a detailed partial view of a fifth embodiment of a clamp, FIG. 21a shows a front view of a seventh embodiment of a clamping device in different assembly positions, FIG. 21b shows a first side view of a seventh embodiment of a clamping device in different assembly positions, FIG. 21c shows a second side view of a seventh embodiment of a clamping device in different assembly positions, FIG. 21d shows a third side view of a seventh embodiment of a clamping device in different assembly positions, FIG. 22a shows a top view of a sixth embodiment of a clamp, FIG. 22b shows a left side view in section of a sixth embodiment of a clamp, FIG. 22c shows a front view of a sixth embodiment of a clamp, FIG. 22d shows a right side view of a sixth embodiment of a clamp, FIG. 22e shows a detailed partial view of a sixth embodiment of a clamp, FIG. 23a shows a top view of a ninth embodiment of a closing sheet, FIG. 23b shows a left side view in section of a ninth embodiment of a closing sheet, FIG. 23c shows a front view of a ninth embodiment of a closing sheet, FIG. 23d shows a right side view of a ninth embodiment of a closing sheet, FIG. 23e shows a bottom view of a ninth embodiment of a closing sheet, FIG. 24a shows a front view of an eighth embodiment of a clamping device in different assembly positions, FIG. 24b shows a first side view of an eighth embodiment of a clamping device in different assembly positions, FIG. 24c shows a second side view of an eighth embodiment of a clamping device in different assembly positions, FIG. 24d shows a third side view of an eighth embodiment of a clamping device in different assembly positions, FIG. 25a shows a top view of a seventh embodiment of a clamp, FIG. 25b shows a left side view in section of a seventh embodiment of a clamp, FIG. 25c shows a front view of a seventh embodiment of a clamp, FIG. 25d shows a right side view in section of a seventh embodiment of a clamp, FIG. 25e shows a detailed partial view of a seventh embodiment of a clamp, FIG. 26a shows a top view of a tenth embodiment of a closing sheet, FIG. 26b shows a first front view in section of a tenth embodiment of a closing sheet, FIG. 26c shows a left side view in section of a tenth embodiment of a closing sheet, FIG. 26d shows a second front view in section of a tenth embodiment of a closing sheet, FIG. 26e shows a right side view of a tenth embodiment of a closing sheet, FIG. 26f shows a bottom view of a tenth embodiment of a closing sheet, The FIG. 1a)-1c) show in a front, side and top view a first embodiment of a clamping and holding device 10 for connecting a profile 12 such as a square profile on a second profile 14 such as a T profile preferably hanging from a ceiling (not shown) and running transversely to the first profile. A left image half of the figures shows the clamping and holding device 10 in an assembled state and a right image half of the figures shows the clamping and holding device 10 in a pre-assembled state.

The holding device 10 comprises a clamp 16 shown in the FIG. 2a)-2f) in different views in partial section. The clamp 16 comprises two shanks 18, 20 that can be adjusted to one another and that can be fixed by end sections 22, 24 to an upper, preferably square ceiling-side section 26 of the second profile 14. Preferably rectangular recesses 28, 30 are provided in the shanks 18, 20 in which recesses the square profile is received in the longitudinal direction.

According to the invention the clamping and holding device 10 comprises a closing sheet 32, 33 that cooperates with the shanks 18, 20. The closing sheet 32 is shown in the FIG. 3a)-3e) in a first embodiment in different views. Stops 34, 36, 38, 40 are provided on the closing sheet 32 along which the shanks 18, 20 can be moved by a screw element 42 such as a threaded pin running vertically or substantially vertically. The screw element 42 is received in a section 43 connecting the shanks 18, 20 and located in a threading 45 and the screw element runs substantially parallel to the shanks 18, 20.

Sections 44, 46, 48, 50 project from the shanks 18, 20 and cooperate with the stops 34, 36, 38, 40 and cross the shanks 18, 20 pivot towards one another for a positive connection with the section 26 of the second profile during the rotation of the screw element 42 against the first profile 12.

In the pre-assembled state (right image half of the FIGS. 1a)-1c)) the first profile 12 extends through the recesses 28, 30 of the clamp 16. The closing sheet 32 is received in the recesses 28, 30 of the shanks 18, 20 and is arranged between the first profile 12 and the section 26 of the second profile 14.

In this state the projecting sections 44, 46, 48, 50 do not yet rest on the stops 34, 36, 38, 40 and the shanks 18, 20 have a straight course.

The clamp 16 moves in the direction of the arrow 54 by rotating the threaded pin 42 in the threading 45, wherein the projecting sections 44, 46, 48, 50 of the shanks 18, 20 are loaded with force against the stops 34, 36, 38, 40 of the closing sheet with the consequence that at least the lower sections of the shanks 18, 20 pivot toward one another in order to enter into a positive connection with the section 26. In this position the first profile 12 is loaded via the threaded pin 42 against the closing sheet 32 with force, while the second profile 14 with the section 26 is positively grasped by the ends 22, 24 of the shanks 18, 20 and rests loaded with force against the closing sheet 32.

Consequently, a vertical movement (rotation of the threaded pin 42) in the direction of the arrow 54 is converted into a horizontal movement (pivoting of the shanks 18, 20) in order to make possible the positive connection of the shanks with the section 26.

In order that the closing sheet 32 is fixed in a pre-manufactured state of the holding device 10, i.e., when the closing sheet 32 extends through the recesses 28, 30 of the shanks 18, 20 and therefore a simple insertion and/or simple handling is ensured, it is provided that stud-shaped projections 56, 58, 60, 62 start from the shank in order to fix and limit the closing sheet 32 in an area between an upper, ramp-like edge of the projecting sections 44, 46, 48, 50 and the stud-shaped projections 56, 58, 60, 62.

FIGS. 4a) to 4e) show the closing sheet 33 in a second embodiment in different views, wherein the same features are provided with the same reference numerals.

The closing sheet 33 differs from the first embodiment of the closing sheet 32 in that two opposite webs 65, 67 extend parallel to or substantially parallel to the stops 34, 36, 38, 40 along a center line 63 of the closing sheet, as a result of which a support width for the section 26 of the T profile bar 14 is enlarged. This simplifies the assembly of the clamping device since the clamping device can be reliably placed in the pre-assembled state along the center line 63 onto the ceiling-side section 26 of the T profile 14.

The FIGS. 5a) to 5c) show a second embodiment of a clamping device 64 with which the first profile 12 can be connected at a distance to the second profile 14.

The clamping device 64 comprises a clamp 66 that is shown in partial sections in the FIGS. 6a) to 6f) in different views. The clamp 66 comprises two shanks 68, 70 that can be adjusted relative to one another and that can be fixed by in sections 72, 74 to the upper, ceiling-side section 26 of the second profile 14. Preferably rectangular recesses 76, 78 are provided in the shanks 68, 70 in which recesses the square profile is received in the longitudinal direction.

According to the invention the clamping device 64 comprises a closing sheet 80, 81 that cooperates with the shanks 68, 70.

The FIGS. 7a) to 7e) show a third embodiment of the closing sheet in different views. The closing sheet 80 is constructed to be substantially U-shaped with lateral shanks 84, 86 connected to one another by a section 88. The section 80 comprises stops 90, 92, 94, 96 that are formed by recesses in edge areas of the section.

Edge-side ends 98, 100 of the shanks 84, 86 form a a first support that rests against a bottom of the first profile 12 while a bottom 102 of the section 88 forms a second stop that rests on an upper side of the section 26 of the second profile 14. The interval between the first profile 12 and the second profile 14 can be defined by the length of the shanks 84, 86.

The clamp 66 can be moved by a vertically or substantially vertically running screw element 104 such as a threaded pin transversely to the longitudinal direction of the first profile 12 and relatively to the closing sheet 80. The screw element 90 is received in a section 106 in a threading 108 and connecting the shanks 68, 70 and runs substantially parallel to the shanks 68, 70.

Sections 110, 112, 114, 116 project from the shanks 68, 70, cooperate with the stops 90, 92, 94, 96 and cause the shanks 68, 70 to pivot toward one another for a positive connection to the section 26 of the second profile during the rotation of the screw element 104 against the first profile 12.

FIGS. 8a) to 8e) show the closing sheet 81 in different views in a fourth embodiment, wherein identical features are designated with identical reference numerals. The closing sheet 81 differs from the closing sheet 80 in that webs 119, 121 are arranged opposite one another along a center line 117 running parallel or substantially parallel to the stop surfaces 90, 92, 94, 96 in order to enlarge a support surface or support width of the closing clamp on the ceiling-side section 26 of the T profile 14.

FIGS. 9a) to 9c) show a third embodiment of a clamping and holding device 118 with a third embodiment of a clamp 120 and a third embodiment of a closing sheet 122.

FIGS. 10a) to 100 show the clamp 120 in different views, wherein the FIG. 10a) shows a front view in partial section, FIG. 10b) a side view sectioned along the section line B-B, FIG. 10c) a bottom view in partial section along the section line C-C, FIG. 10d) a top view and FIG. 10e) a lateral view from the left. FIG. 10f) shows a detail of a stud-shaped projection 60 for fixing the closing sheet.

The clamp 120 differs from the clamp 16 according to FIG. 1 in that sections 128, 130, 132, 134 projecting from shanks 124, 126 do not project from an inner edge of recesses 136, 138 but rather from an outer edge 140, 142, 144, 146 of the shanks 124, 126.

FIGS. 11a) to 11e) show different views of the closing sheet 122, wherein FIG. 11a) shows a front view, FIG. 11b) a side view from the left, FIG. 11c) a side view from the right in partial section along the section line A-A, FIG. 11d) a bottom view and FIG. 11e) a top view.

The closing sheet comprises a recess 150 forming an inner frame 148 in which the clamp is received in such a manner that that it can move longitudinally. A rotary movement of a screw element 154 received in section 150 in a threading 152, which section connects the shanks, in the direction of the arrow 156 against the first profile caused a relative movement of the clamp against the closing sheet. As a result, the sections 128, 130, 132, 134 come in contact with their ramp-like edge with the inner frame 148 of the closing sheet.

The inner frame 148 forms a stop, so that a furthermore adjustment of the clamp causes the shanks 124, 126 to move toward one another.

The fifth embodiment of the closing sheet 122 is constructed with reinforcement ribs 158, 160, 162, 164 on its edge. The closing sheet 122 is preferably constructed as a shaped part, especially as a stamped part, wherein the reinforcement ribs 158, 160, 162, 164 are bent at a right angle out of the flat material.

The FIGS. 12a) to 12c) show a front, side and top view of a fourth embodiment of a clamping device 166 with a fourth embodiment of a clamp 168 and a sixth embodiment of a closing sheet 170.

FIGS. 13a) to 130 show the clamp 168 in different views, wherein FIG. 13a) shows a top view, FIG. 13b) a front view in partial section along the section line A-A according to FIG. 13a), FIG. 13c) a bottom view in partial section along the section line C-C according to FIG. 13b), FIG. 13d) a sectional view along section line B-B according to FIG. 13b) and FIG. 13e) a side view from the left. FIG. 13f) shows a detail of a stud-shaped projection 60 for fixing the closing sheet.

FIGS. 14a) to 14e) show the closing sheet 170 in different views, wherein FIG. 14a) shows a front view, FIG. 14c) a side view along the section line A-A according to FIG. 14a), FIG. 14b) a side view from the left, FIG. 14e) a top view and FIG. 14d) a bottom view.

The sixth embodiment of the closing sheet 170 is used if an interval is desired or required between the first profile 12 and the second profile 14, for example, if an adjustment in height is required between the first profile 12 and a suspended ceiling for fitting in a sprinkler system.

The closing sheet 170 is constructed substantially in a U shape and comprises shanks 172, 174 connected to one another by a section 176. A recess 178 for forming an inner frame 180 is introduced in the section 176 by which frame stops 182, 184 are formed. The shanks 172, 174 are bent inwardly toward one another on their end side in order to form first supports 186, 188 that rest against a bottom of the first profile 12. A bottom 190 off the section 176 forms a second support that rests against an upper side of the section 26 of the second profile 14.

A mounting and the clamping take place in a known manner, as has already been previously explained.

FIGS. 15a) to 15c) show in front, side and top views a fifth embodiment of a clamping device 192 for connecting a first profile 12 to a second profile 14 running transversely to the first profile. The clamping device 192 comprises a clamp 194 with two shanks 196, 198 that can be adjusted relative to one another and each with a recess 200, 202 for receiving and fixing the first profile 12 and with an end section 204, 206 for fixing the clamp 194 to the section 26 of the second profile 14 (not shown in FIG. 15).

The clamping device 192 furthermore comprises a closing sheet 280 that cooperates with the shanks 196, 198 of the clamp and that comprises stops 210 that cooperate with sections 212 projecting from the shanks 196, 198 upon a relative movement between the clamping device 194 and the clamp 208 in such a manner that the shanks are moved toward one another. In order to produce a relative movement between the shanks 196, 198 and the closing sheet 208, a screw element 214 is arranged in a section connecting the shanks 196, 198 which element can be supported against the first profile 12 so that a rotation of the screw element 214 crosses the shanks to move toward one another for a positive connection of the end sections 204, 206 to the section 26 of the second profile 14.

The clamp 194 is shown in FIGS. 16a)-16g) in different views. The clamp 192 differs from the embodiments of the clamp 16 according to FIG. 2 and of the clamp 66 according to FIG. 6 in that the end sections 204, 206 resting on the section 26 of the second profile 14 comprise formations 216 on their edges that are preferably stamped longitudinally for stiffening the shanks 196, 198 against bending in the lower area.

The stamped formations 216 extend parallel to side edges of the side sections 204, 206. The shown embodiment of the clamping device 192 is furthermore characterized in that perforations 218 are provided in edge sections of the shanks 196, 198 in a transitional area between the shanks 196, 198 and a section 217 connecting the shanks in order to achieve a purposeful weakening of material in the area of a bending line 220, which makes possible a simplified assembly.

FIGS. 17a) to 17e) show the closing sheet 208 in different views. The closing sheet 208 comprises a base plate 220 in which the stops 210, which cooperate with the sections 212 projecting from the shanks 196, 198, are shaped as recesses, as is shown in the lower view (FIG. 17e).

FIG. 17a shows a top view onto the closing sheet 208. The base plate 220 has transverse edges 222, 224 that run in the assembled state transversely to the longitudinal direction of the first profile 12 and comprises longitudinal edges 226, 228 running in the assembled state parallel to the longitudinal direction of the first profile 12. In order to prevent a lateral tilting away during the assembly of the closing sheet, it is provided that right-angle shanks 230, 232 and 234, 236 extend from opposing, lateral edge sections of the transverse edges 222, 224 which shanks have inner surfaces 238 that rest in the assembled state on an outside surface of the first profile in order to prevent a lateral tilting away, as is shown in FIG. 15b).

According to FIG. 17c) the shanks 230, 232, 234, 236 are bent in such a manner that their ends have a distance K from each other that corresponds to a width K of the clamp 194 so that closing sheet 208 rests on the one hand by the inner surfaces 238 of the shanks 230, 232, 234, 236 on the profile 12 and on the other hand by the inner surfaces 240 of the bent ends 242 of the shanks 230, 232, 234, 236 on the clamp 194.

Furthermore, other shanks 244, 246 extend from the longitudinal edges 226, 228 located oppositely that are constructed shorter in comparison to the shanks 230, 232, 234, 236 and are bent at a right angle to the baseplate 220 and run straight.

The short, straight shanks 244, 246 serve for the inner support of the clamp 194 and prevent the clamp 194 from falling inward during assembly.

FIGS. 18a) to 18c) show a front, side and top view of a sixth embodiment of a clamping device 248 for connecting the first profile 12 to the section 26 of the second profile 14, which section runs at a distance transversely to the first profile (not shown in FIG. 18). The clamping device 248 comprises a clamp 250 with two shanks 252, 254 that can be adjusted toward one another and each with a recess 256, 258 for receiving and fixing the first profile 12 and with an end section 260, 262 for being fixed to the section 26 of the second profile 14.

Furthermore, the clamping device 248 comprises a closing sheet 264 that cooperates with the shanks 252, 254 of the clamp 250. The closing sheet 264 forms stops 266 that cooperate with sections 268 projecting substantially at a right angle from the shanks at a relative movement between the clamp 250 and the closing sheet 264 in such a manner that the shanks 250, 254 are moved toward one another.

In order to produce a relative movement between the shanks 252, 254 and the closing sheet 264 the clamp 250 comprises a screw element 270 that can be supported against the first profile 12, so that the shanks 252, 254 are moved toward one another by rotating the screw element for a positive connection of the end sections 260, 262 to the section 26 of the second profile 14.

The embodiment of the clamping device 248 shown in FIG. 18 differs from the embodiment of the clamping device 192 shown in FIG. 15 in that the section 26 of the second profile is arranged at a defined distance from the first profile.

It is provided for the definition of the distance that the closing sheet 264 comprises two shanks 278, 280 starting from a base plate 272 along edges 274, 276 running transversely to the longitudinal extent of the profile 12 which shanks each form a stop 282, 284 on the upper side on which stop a bottom of the profile 12 can be supported. Furthermore it is provided for a simplified assembly that shank sections 286, 288, 290, 292 extend laterally over the stop 282, 284 and whose inner surfaces rest in the assembled state on an outer surface of the first profile 12 and form a guide in order to prevent a lateral tilting away of the closing sheet during assembly, as is shown in FIG. 18b).

Furthermore, it is provided that shanks 294 are provided bent at a right angle along longitudinal edges of the base plate 272 for the inner support of the clamp 250 which prevents the clamp 250 from falling off during assembly.

Details of the clamp 250 and of the closing sheet 264 are shown in the FIGS. 19a) to 19g) and 20a) to 20e).

FIGS. 21a) to 21d) show an especially preferred embodiment of a clamping device 298 for connecting the first profile 12 to the second profile 14 running transversely to the first profile 12. The clamping device 298 comprises a clamp 300 with two shanks 302, 304 that can be adjusted to one another and with a recess 306, 308 for receiving and fixing the first profile 12. The shanks 302, 304 have an end section 310, 312 for fixing the section 26 of the second profile 14 against the first profile 12.

The clamping device 298 furthermore comprises a closing sheet 314 that cooperates with the shanks 302, 304 of the clamp 300 and has stops 316 that cooperate with sections 318 projecting from the shanks and in the shape of material curvatures upon a relative movement between the clamp 300 and the closing sheet 314 in such a manner that the shanks are moved toward one another, as is shown in FIGS. 21c) and 21d). In order to produce a relative movement between the shanks 302, 304 and the closing sheet 314 a screw element 320 is arranged in a section connecting the shanks 302, 304 which element can be loaded with force against the first profile 12 so that the shanks 302, 304 can be moved transversely to the closing sheet 314 resting on a bottom of the first profile 12 by rotating the screw element. As a result of the relative movement the curvatures 318 come in contact with the stops 320 of the closing sheet 314 and bring about the movement of the shanks toward one another for a positive connection of the end sections 310, 312 to the section 26 of the second profile 14, as is shown in the end position in FIG. 21d). The end sections 310, 312 now lie substantially parallel to side walls of the section 26 of the second profile 14 in order to fix the latter.

FIGS. 22a) to 22e) show the clamp 250 in different views. The clamp 250 is characterized in that, in contrast to the previously described embodiments of the clamp 16, 66, 120, 168, 194, the stops 318 are constructed as material curvatures or stampings in the shanks 302, 304 of the clamp 250. As a consequence, on the one hand a stiffening of the end sections 260, 262 of the shanks 302, 304 into the lower area is achieved and on the other hand a larger support surface of the projecting sections 318 against the stops 316 of the closing sheet 314 is achieved on which the projecting sections 318 slide during the closing. Since no recesses are produced in the inner area of the clamp the lateral guiding of the clamp on the profile is improved.

Another differentiating feature that should be mentioned, especially regarding the embodiments of the clamps 16, 66 is that perforations 322 are introduced in the shanks 302, 304 in the area of the section connecting the shanks 302, 304 and bring about a purposeful material weakening of the shanks 302, 304. This achieves the advantage that during the closing of the clamp 250, i.e., during the moving toward one another of the shanks 302, 304 by the rotary movement of the screw element 320 less expenditure of force is required on account of the lesser bending tension. The result is an elastic and low plastic deformation of the shanks 302, 304 along a bending line 324 which avoids a lateral distortion of the clamp 250.

Curvatures 326 are provided in a vertical direction above the projecting stampings 318. The closing sheet is fixed between the curvatures 326 and the stampings 318.

Furthermore, a purposeful deformation and bending is made possible in the upper area of the shanks 302, 304 along the bending line 324 and with it the maintaining of the provided bending angle.

Furthermore, FIG. 22b), 22d) show that the end sections 260, 262 of the shanks are bent outward at a defined angle α before the assembly already so that after the closing the end sections 260, 262 run in parallel without a deformation resulting in the central area.

FIG. 23a), 23e) show the closing sheet 314 in different views. The closing sheet 314 consists of a base plate 328 in whose longitudinal edges 330, 332 recesses are formed for forming the stops 316.

FIG. 23c shows a sectional view along the section line A-A according to FIG. 23a), wherein the base plate 328 comprises two block-outs 338 bent in the direction of a vertical axis 336 that are bent at an angle of approximately 45° to a plane set by the base plate 328. A prismatic centering is formed by the two inwardly located block-outs 338, as a result of which the positioning, i.e., the lateral alignment of the clamp 250 on the profile bar is improved and in addition a clamping is achieved in the lower area after the closing of the clamp 250.

FIG. 24 shows another variant of a clamping device 340 connecting the first profile 12 to the second profile 14 running transversely to the first profile, wherein the second profile 14 is arranged at a distance from the first profile 12. The clamping device 340 comprises a clamp 342 with two shanks 344, 346 that can pivot toward one another and each with a recess 348 for receiving and fixing the first profile 12. Furthermore, each of the shanks 340, 346 comprises an end section 350 for fixing the section 26 of the profile 14, as is shown in the FIGS. 24b) to 24d).

Furthermore, the clamping device 340 comprises a closing sheet 352 cooperating with the shanks 344, 346 of the clamp, wherein stops 354 are formed on the closing sheet that cooperate with sections 356 projecting from the shanks 344, 346 and in the form of curvatures or stampings upon a relative movement between the clamp 342 and the closing sheet 352 in such a manner that the shanks are moved toward one another, as is shown in the FIGS. 24b) to 24d).

In order to produce a relative movement between the clamp 342 and the closing sheet 352 a screw element 358 is arranged in a section connecting the shanks 344, 346 which can be loaded by force against the first profile by rotation so that a rotation of the screw element causes the shanks to move toward one another in order to form a positive connection of the end sections with the section 26 of the second profile 14.

The clamp 342 is shown in FIGS. 25a) to 25e) in different views and substantially corresponds to the construction of the clamp 300 according to FIG. 22 with lengthened shanks 344, 346. Corresponding to the embodiment according to FIG. 22 the shanks 344, 346 also have recesses 362 for the purposeful material weakening of the shanks 344, 346 in order to bring about an elastic and low plastic deformation with a low expenditure of force of the shanks 344, 346 along the bending line 364.

The closing sheet 354 is shown in FIGS. 26a) to 26f) in different views. Lateral shanks 368 extend starting from a base plate 366 whose height defines an interval of the section 26 of the second profile 14 from the first profile 12. The shanks 368 comprise a stop 370 on the end which stop rests on a bottom of the first profile 12 and/or can be supported against it. The shanks 368 together with the base plate 366 form a substantially U shape.

FIG. 26a) shows a top view of the closing sheet 352, wherein recesses are formed in side edges 372 in order to form the stops 354. Furthermore, an inwardly directed curvature 374 is constructed substantially centrally in the base plate in order to reinforce the baseplate.

The invention claimed is:

1. A clamping device for connecting a first profile such as a square profile to a second profile such as a T profile that runs transversely to the first profile, the clamping device comprising:
   a clamp with two shanks that can be adjusted to one another and which have a recess for receiving and fixing the first profile and with an end section for being fixed to a section of the second profile,
   a screw element for moving the shanks toward one another, and
   a closing sheet with stops, which closing sheet cooperates with the shanks of the clamp,
   wherein the screw element starts from a section connecting the shanks and can be supported against the first profile for adjusting the shanks relative to the closing sheet, whereby sections projecting from the shanks cooperate with the stops and during the adjusting of the clamps the pivoting of the shanks onto one another brings about the positive connection of the end sections to the section of the second profile.

2. The clamping device according to claim 1, wherein the screw element is received as a threaded pin in a threading introduced into the section or is received in a nut starting from the section.

3. The clamping device according to claim 1, wherein the screw element runs vertically to a plane stretching from the closing sheet, wherein a ceiling-side end is formed as a tool receptacle and is freely accessible and wherein a profile-side end of the screw element can be supported against the first profile.

4. The clamping device according to claim 1, wherein the projecting sections of the shanks can move continuously in the closed state along the stops of the closing clamps until the bent end sections of the shanks come to rest on the section of the second profile.

5. The clamping device according to claim 1, wherein the clamp is constructed as a U-shaped mold sheet part.

6. The clamping device according to claim 4, wherein the projecting edges are formed on an inner edge of the rectangular recess or on an outer edge of the particular shank and/or wherein the projecting stampings are formed in lateral edge sections of the particular shank.

7. The clamping device according to claim 4, wherein the projecting edges run in a plane that runs at a right angle to a plane stretching from the shank.

8. The clamping device according to claim 1, wherein at least two of the projecting sections of a shank are associated with stud-like projections in such a manner that the closing sheet is fixed between a ramp-shaped edge of one of the sections and the at least one stud-shaped projection in the pre-assembled state and/or wherein each of the projecting sections of a shank is associated with stud-like projections.

9. The clamping device according to claim 1, wherein the shanks have a material weakening in the form of perforations in the form of holes or notches in a transitional area to the section receiving the screw element or in a central area along a bending line.

10. The clamping device according to claim 1, wherein the shanks of the clamps have oblong, outwardly shaped formations for stiffening the shanks along their end sections and/or wherein the shanks are bent outward at an angle α in the central area before the assembly already.

11. The clamping device according to claim 1, wherein the closing sheet comprises two opposing recesses on the edge side, wherein edge sections of each recess, which edge sections oppose each other, form one of the stops for the sections projecting from the shank.

12. The clamping device according to claim 1, wherein the edge sections have an interval from each other that corresponds to an interval of the shanks in the pre-assembled state.

13. The clamping device according to claim 1, wherein the closing sheet is U-shaped and comprises shanks wherein the end section of the shank forms a first support and a bottom of the section connecting the shanks forms a second support.

14. The clamping device according to claim 1, wherein the closing sheet comprises shanks that are bent substantially at a right angle from opposing transverse edges of a base plate and extend in the mounted state parallel to or substantially parallel to side surfaces of the first profile, wherein inner surfaces of the shanks rest on the side surfaces of the profile and/or wherein the closing sheet comprises shanks bent from longitudinal edges of the base plate, which shanks extend substantially at a right angle from longitudinal edges and run in the assembled state parallel to or substantially parallel to side surfaces of the first profile.

15. The clamping device according to claim 1, wherein the closing sheet comprises bent flaps starting from a base plate and running along a longitudinal axis at an angle of about 45°, which flaps form a prismatic centering for the shanks of the clamp.

16. The clamping device according to claim 1, wherein sections projecting from the shanks are formed as edges in the form of a flap or as an impression in the form of a material curvature.

* * * * *